C. S. PARKER.
GASKET.
APPLICATION FILED APR. 21, 1910.
1,054,863.
Patented Mar. 4, 1913.
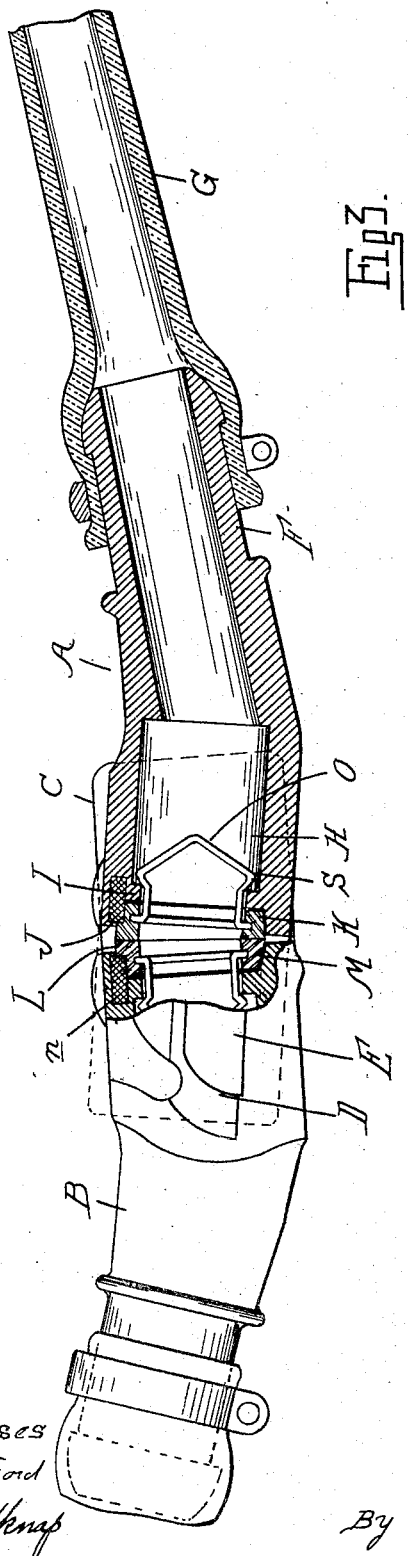
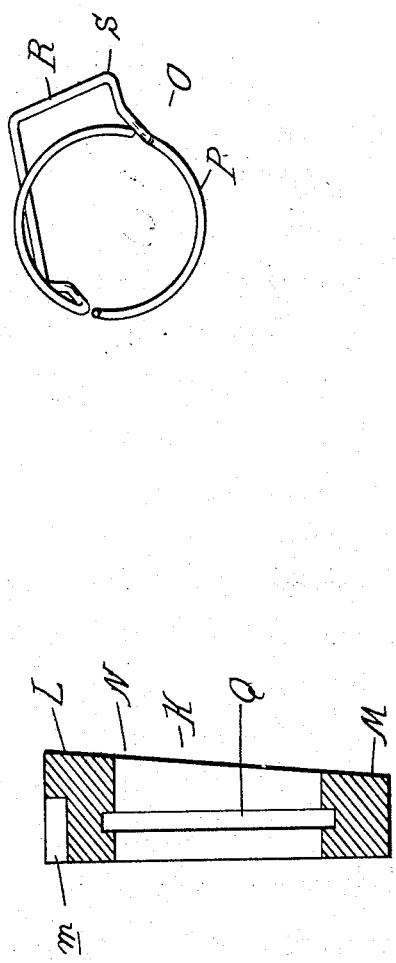
Witnesses
Inventor
Calvin S. Parker
By

UNITED STATES PATENT OFFICE.

CALVIN S. PARKER, OF LONDON, ONTARIO, CANADA.

GASKET.

1,054,863.  Specification of Letters Patent.  Patented Mar. 4, 1913.

Application filed April 21, 1910. Serial No. 556,827.

*To all whom it may concern:*

Be it known that I, CALVIN S. PARKER, a subject of the King of Great Britain and Ireland, residing at London, in the Province of Ontario and Dominion of Canada, have invented certain new and useful Improvements in Gaskets, of which the following is a specification, reference being had therein to the accompanying drawings.

My invention relates to improvements in gaskets for pipe couplers, especially designed for gravity couplers of the straight-port type, in which the locking movement of the couplers is limited by the abutting faces of the gaskets.

Among the objects of my invention are to increase the life of the gasket, to provide a gasket which will effectively prevent leakage, and which may be easily and quickly detached from the coupler.

The invention resides in the construction of the gasket, in the arrangement thereof in relation to the coupling member, and, further, in the peculiar construction, arrangement and combination of parts as more fully hereinafter described and pointed out in the claims.

In the drawings; Figure 1 is a sectional side elevation of a coupler embodying my invention; Fig. 2 is a central section through a gasket embodying my invention; and Fig. 3 is a perspective view of the retainer for the gasket.

The coöperating couplers A and B are of the straight-port gravity type, and each is provided with the usual laterally-projecting arm C, having a cam faced projection or hook D on the outer end thereof, and adapted to engage the projection E of the coöperating coupler.

F represents the neck of the coupler to which the flexible hose G extending from the train pipe of the car is connected.

Depending from the inner wall H of the steam passage is an annular projection I positioned adjacent the face J of the coupler, and forming with that portion of the inner wall beyond the projection a seat for the gasket K.

In stationary gaskets heretofore used the face of the gasket has been positioned in a plane parallel to the face and perpendicular to the longitudinal axis of the coupler, and, therefore, since the meeting faces of the gaskets must lie in the same plane in order to tightly seal the joint between the couplers, it will be readily seen that in the locked position of the couplers the longitudinal axes of the latter would have to lie in the same straight line,—which relation of the couplers will be hereinafter termed as the horizontal position. Therefore, when the gaskets have become worn sufficiently to permit the adjacent ends of the couplers to drop below the horizontal position, the longitudinal axis of the couplers will assume an angular relation to each other, which as will be readily understood will position the meeting faces of the gaskets in upwardly-diverging planes, thereby separating the gaskets at their lower edges, causing leakage.

Since the wear on the gasket of a train pipe coupling is exceedingly great, and as the usual and preferable construction of gasket for train pipe couplers is formed of a composition which becomes more or less plastic under the action of steam, such a construction of gasket is very short lived. In order to increase the life of the gasket, I arrange the meeting faces thereof in relation to the couplers, so as to seal the joint between the latter when the meeting ends of the coöperating couplers are arranged above the horizontal position. Thus, as shown, the upper portion L of the gasket is formed of greater thickness than the lower portion M, and the gasket is so arranged in relation to its seat that the thickest portion of the gasket is adjacent the top of the coupler. This positions the outer or meeting face N of the gasket in a plane oblique to the longitudinal axis of the coupler and nonparallel to the coupler face, the divergency between the planes of the coupler and the gasket faces being greatest at the top of the coupler. The meeting faces of the gasket therefore tightly abut, and seal the joint between the couplers when the meeting ends of the latter are above the horizontal position. As the gasket wears, the couplers will gradually assume the horizontal position, but as the wear is greatest upon the upper edge of the gasket face a tight joint is at all times maintained until the gasket has worn sufficiently to permit the meeting ends of the couplers to fall below the horizontal position.

The gasket is properly positioned in relation to its seat by means of a recess $m$ formed in one edge of the gasket, which is adapted to engage a projection, such as a pin n, extending within the seat.

O is a retaining member for securing the gasket to its seat and comprises a split annular portion P for engaging an annular recess Q formed in the gasket, and a loop-shaped section R projecting transversely from said annular portion and bent to form projections or lugs S adapted to have a locking engagement with the annular projection I. This construction of retaining member permits the same to be formed of spring wire, and also since the tendency of the split annular portion is to expand, it forms a reinforcement for the gasket.

While I have shown and described my improved construction of gasket, as applied to a train hose coupling, it will be understood that it may be applied to couplings of various types.

What I claim as my invention is:

1. The combination with coöperating couplers of the gravity type, of stationary gaskets carried by said members arranged to seal the joint between the couplers when the meeting ends of the latter are above the horizontal position.

2. The combination with coöperating couplers of the gravity type having gasket seats, of stationary gaskets engaging said seats each having its outer face diverged from the seat toward the top of the coupler for the purpose described.

3. The combination with a coupler of the gravity type having a stationary gasket seat in the end thereof, of a stationary gasket having its outer face positioned in a plane diverging outwardly and upwardly from the plane of the end of said coupler.

In testimony whereof I affix my signature in presence of two witnesses.

CALVIN S. PARKER.

Witnesses:
 JAMES P. BARRY,
 N. KINSELLA.